US011636391B2

(12) United States Patent
Patten, Jr. et al.

(10) Patent No.: US 11,636,391 B2
(45) Date of Patent: Apr. 25, 2023

(54) AUTOMATIC COMBINATORIC FEATURE GENERATION FOR ENHANCED MACHINE LEARNING

(71) Applicant: International Business Machines Corporation, Armonk, NY (US)

(72) Inventors: Willie Robert Patten, Jr., Hurdle Mills, NC (US); Eugene Irving Kelton, Mechanicsburg, PA (US); Yi-Hui Ma, Mechanicsburg, PA (US); Jacob McPherson, Franklinton, NC (US)

(73) Assignee: International Business Machines Corporation, Armonk, NY (US)

(*) Notice: Subject to any disclaimer, the term of this patent is extended or adjusted under 35 U.S.C. 154(b) by 451 days.

(21) Appl. No.: 16/830,611

(22) Filed: Mar. 26, 2020

(65) Prior Publication Data

US 2021/0304058 A1  Sep. 30, 2021

(51) Int. Cl.
 G06N 20/00  (2019.01)
 G06F 16/9038  (2019.01)

(52) U.S. Cl.
 CPC ......... *G06N 20/00* (2019.01); *G06F 16/9038* (2019.01)

(58) Field of Classification Search
 None
 See application file for complete search history.

(56) References Cited

U.S. PATENT DOCUMENTS

| | | | |
|---|---|---|---|
| 6,671,811 B1 | 12/2003 | Diep et al. | |
| 9,372,976 B2 | 6/2016 | Bukai | |
| 2015/0186425 A1* | 7/2015 | Chang | G06F 16/58 |
| | | | 707/728 |
| 2016/0132718 A1* | 5/2016 | Park | G06V 10/243 |
| | | | 382/118 |
| 2017/0111574 A1* | 4/2017 | Miyashita | H04N 5/232945 |
| 2018/0218283 A1 | 8/2018 | Jenson | |
| 2018/0253737 A1 | 9/2018 | Hanis et al. | |
| 2018/0357714 A1 | 12/2018 | So et al. | |
| 2019/0073647 A1 | 3/2019 | Zoldi et al. | |
| 2019/0104827 A1* | 4/2019 | Nishi | G16H 20/70 |
| 2019/0114649 A1 | 4/2019 | Wang et al. | |
| 2019/0139578 A1* | 5/2019 | Okamoto | H04N 5/23219 |
| 2019/0141183 A1 | 5/2019 | Chandrasekaran et al. | |
| 2019/0342491 A1* | 11/2019 | Mandavilli | H04N 5/23219 |
| 2020/0302668 A1* | 9/2020 | Guo | G06V 40/161 |
| 2021/0034894 A1* | 2/2021 | Ebihara | G06V 10/60 |
| 2021/0067684 A1* | 3/2021 | Kim | G06V 40/172 |
| 2021/0314526 A1* | 10/2021 | Astarabadi | H04L 9/0819 |

FOREIGN PATENT DOCUMENTS

WO  20180271381  2/2018

\* cited by examiner

*Primary Examiner* — Toan H Vu
(74) *Attorney, Agent, or Firm* — VanLeeuwen & VanLeeuwen; Jared C. Chaney

(57) ABSTRACT

An approach is provided that automatically computes a number of feature combinations based on a set of subject matter fields that are selected from a set of subject matter fields and further based on qualifiers that correspond to the selected set of subject matter fields. A model in an artificial intelligence (AI) system is then trained using the computed plurality of feature combinations.

20 Claims, 5 Drawing Sheets

AUTOMATIC COMBINATORIC FEATURE GENERATION FOR ENHANCED MACHINE LEARNING

BACKGROUND

In traditional artificial intelligence machine learning, a data scientist typically works with a business subject matter expert (SME) to determine the set of features to generate and the analysis and models that are needed to support a given domain. In the traditional approach, the analysis and models typically determine the set of features. The artificial intelligence machine learning (AI/ML) models are then written to utilize the set of features to support inquiries regarding the given subject matter domain. The current process takes considerable resources, such as time and knowledge of the particular domain, in order to determine the set of features needed to support the domain. To avoid or reduce the resources needed, implementers often use "educated guessing" as to the set of features needed. As can be imagined, such educated guessing leads to a sub-optimal set of features with this sub-optimal feature set being what is used by the models to make predictions and provide other answers regarding the domain. In addition, when models are analyzed or trained against what is deemed the "ground truth," it is this same set of sub-optimal features that are used to determine which one are best at finding a particular answer, such as finding "fraud" in an insurance implementation. If this set of features does not include the optimal set, it may be that a key element, such as "fraud" in the insurance example, is itself missing from the feature set.

SUMMARY

An approach is provided that automatically computes a number of feature combinations based on a set of subject matter fields that are selected from a set of subject matter fields and further based on qualifiers that correspond to the selected set of subject matter fields. A model in an artificial intelligence (AI) system is then trained using the computed plurality of feature combinations.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
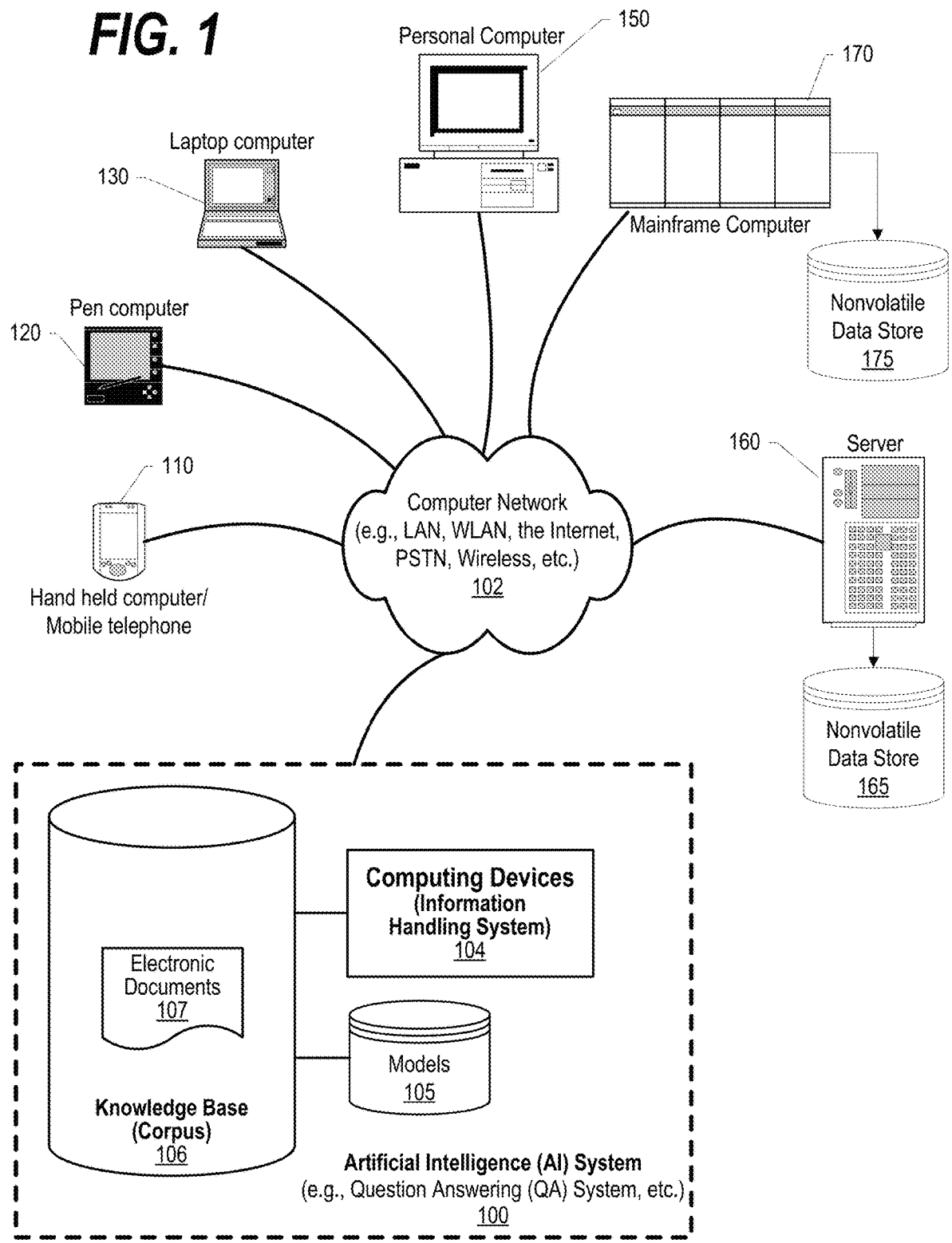
FIG. 1 depicts a network environment that includes a knowledge manager that utilizes a knowledge base.

FIGS. 1-5 describe an approach that is focused on automatically generating the set of possible combinations of fields to create a set of features that are, in turn, used to support a wider analysis from a model trained in an artificial intelligence (AI) system, such as a Question-Answering (QA) system. The optimal set of features, based on the computed combinations, are used by various models in the AI system to identify anomalies in the data, such as to identify cases of fraud in an insurance implementation.

This approach provides a way to automatically generate a large number of features without the need of data scientists and subject matter experts (SMEs) having to come up with all of the combinations while, at the same time, reducing the amount of resource and business domain knowledge required to create a model used by the AI system. In one embodiment, the approach supports a semantic declaration of the types of analysis that may be important on a set of data columns (subject matter fields). In a further embodiment, the semantic declaration itself is machine generated. The approach further supports the upstream meta-data used by models to perform this type of feature based analysis in an AI system. After any historical initial load, the set of feature combinations is generated at scale, thus keeping performance cost rather linear while greatly expanding data to a greater than linear, perhaps even exponential, growth pattern.

In one embodiment, a configuration file is provided by a user, such as an expert, in the field that is being modeled. This file defines the combination of subject matter fields and functionality used to compute a feature. The approach then automatically uses cross-wise and pair-wise iterators to compute a maximum number of feature combinations of the selected subject matter fields and functionality. In one embodiment, a number of statistical calculations are performed using the features generated combined with the aggregated results of specific groups within the data. In a further embodiment, database processes, such as joins, etc., are performed to retrieve data of the computed features along with the raw data previously ingested by the AI system. In one embodiment, this results in a single record with a maximum amount of data. Intermediate and final results of steps can be stored along the way in a format that is efficient for later reuse. In addition, the model can be further trained using the results from the statistical and database operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. AI system 100 may include a knowledge manager computing device 104 (comprising one or more processors and one or more memories, and potentially any other computing device elements generally known in the art including buses, storage devices, communication interfaces, and the like) that connects AI system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. AI system 100 and network 102 may enable question/answer (QA) generation functionality for one or more content users. Other embodiments of AI system 100 may be used with components, systems, sub-systems, and/or devices other than those that are depicted herein.

AI system 100 uses AI model 105 that is a result of training the AI system. The model is a mathematical model that generates predictions by finding patterns in the data stored in corpus 106. In artificial intelligence, AI models 105 are based on the reasoning that works on methods in the AI system. AI models 105 observe data in corpus 106 to derive conclusions and make predictions about such data.

AI system 100 may be configured to receive inputs from various sources. For example, AI system 100 may receive input from the network 102, a corpus of electronic documents 107 or other data, a content creator, content users, and other possible sources of input. In one embodiment, some or all of the inputs to AI system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with AI system 100. Electronic documents 107 may include any file, text, article, or source of data for use in AI system 100. Content users may access AI system 100 via a network connection or an Internet connection to the network 102, and may input questions to AI system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. AI system 100 may interpret the question and provide a response to the content user containing one or more answers to the question. In some embodiments, AI system 100 may provide a response to users in a ranked list of answers.

In some illustrative embodiments, AI system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize AI system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
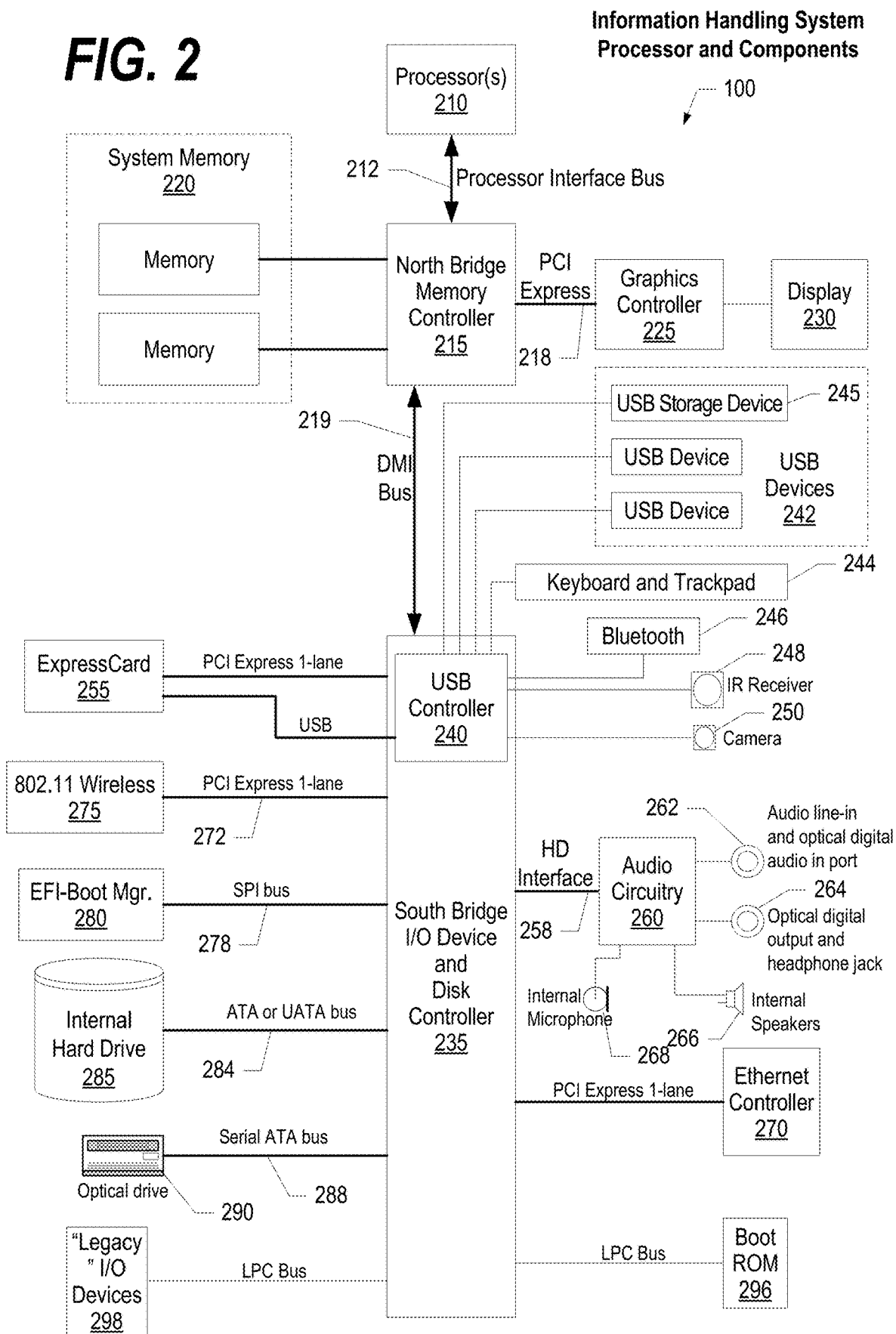
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212.

Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
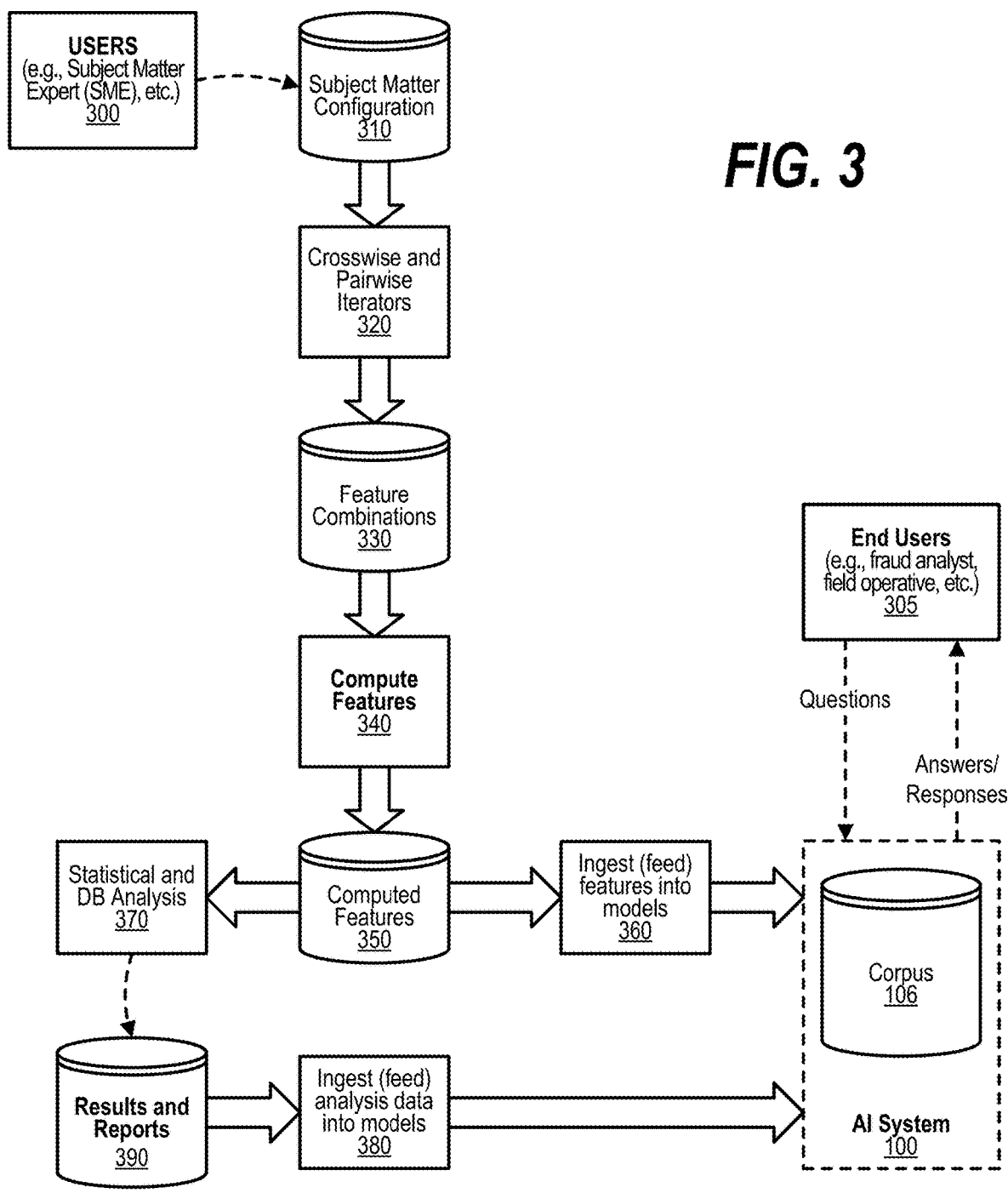
FIG. 3 is a component diagram that shows the components used in a system that uses automatic combinatoric feature generation for enhanced artificial intelligence machine learning.

FIG. 3 is a component diagram that shows the components used in a system that uses automatic combinatoric feature generation for enhanced artificial intelligence machine learning. The process retrieves subject matter configuration data from users 300 such as subject matter experts (SMEs), etc. The configuration data is stored in subject matter configuration data store 310.

Figure 4:
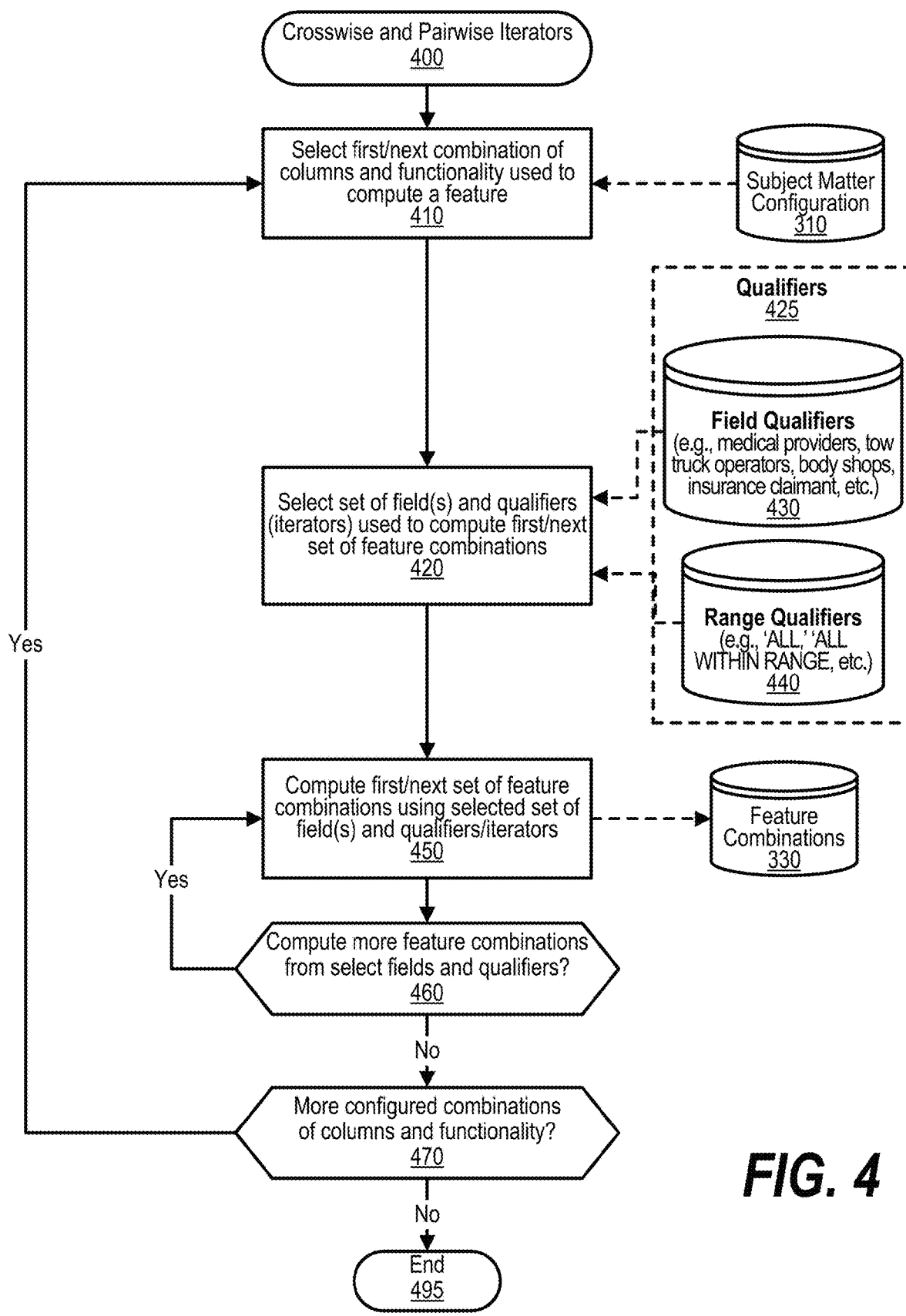
FIG. 4 is a depiction of a flowchart showing the logic used to generate crosswise and pairwise iterators used in automatic combinatoric feature generation for enhanced artificial intelligence machine learning.

At step 320, the process performs crosswise and pairwise iteration processes as shown in FIG. 4 using the configuration data stored in data store 310. The result of step 320 are feature combinations that are stored in feature combinations data store 330.

Figure 5:
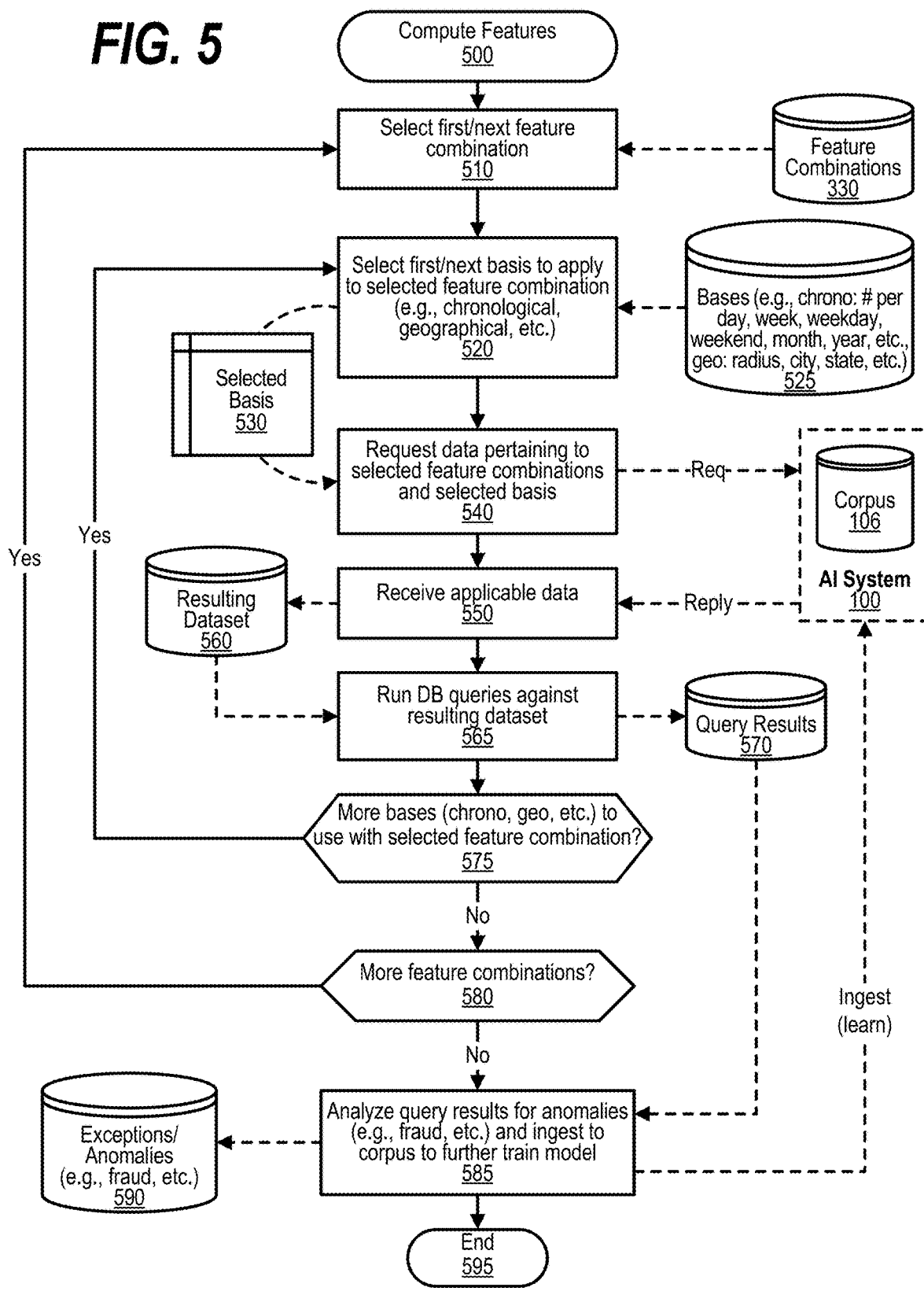
FIG. 5 is a depiction of a flowchart showing the logic used to automatically compute the features from the generated feature combinations that are used to enhance artificial intelligence machine learning.

At step 340, the process computes features as shown in FIG. 5. The features are computed using the feature combinations that were stored in data store 330. The computed features are then stored in data store 350. At step 360, the process ingests, or "feeds" the computed features into one or more AI models utilized by AI system 100.

At step 370, the process performs statistical and database analyses on the data that was retrieved using the computed features by the AI system. The statistical and database analyses data are stored in results and reports data store 390. For example, in an insurance implementation, the results and reports might include anomalies, such as fraud detection found in insurance claims, etc. At step 380, the process ingests, or feeds the analysis data into the AI models to further train the models using the results of the statistical and database analysis processes.

End users 305, such as a fraud analyst in an insurance implementation, utilizes trained AI system by making requests, such as questions, to trained AI system 100. The trained AI system 100 responds with predictions based on the data used by the AI system (e.g., insurance based data, etc.) and the models that have been trained using the feature combinations generated by the process shown in FIG. 5. In an insurance setting, such predictions might be whether a particular insurance claim is fraudulent.

FIG. 4 is a depiction of a flowchart showing the logic used to generate crosswise and pairwise iterators used in automatic combinatoric feature generation for enhanced artificial intelligence machine learning. FIG. 4 processing commences at 400 and shows the steps taken by a process that uses crosswise and pairwise iterators to create feature combinations. At step 410, the process selects the first combination of columns and functionality (collectively, subject matter fields) that are used to compute a feature. The subject matter fields are retrieved from subject matter configuration data store 310.

At step 420, the process selects a set of subject matter fields and qualifiers 425, such as field qualifiers 430 and range qualifiers 440, that are used to compute the first set of feature combinations. Step 420 retrieves the field qualifiers from data store 430 and the range qualifiers from data store 440. In an insurance setting, field qualifiers might include medical providers, tow truck operators, body shops, insurance claimant, and the like. Meanwhile, range qualifiers might include 'all,' 'all within a range,' and the like. For example, a combination might be to select "all medical providers within a fifty mile radius," etc.

At step 450, the process computes the first set of feature combinations using the selected set of subject matter fields and the qualifiers pertaining to the selected set of subject matter fields. The computed feature combinations are stored in data store 330. The process determines as to whether there are more feature combinations to compute from the select subject matter fields and qualifiers (decision 460). If there are more feature combinations to compute from the select subject matter fields and qualifiers, then decision 460 branches to the 'yes' branch which loops back to step 450 to compute the next set of feature combinations. This looping continues until there are no more feature combinations to compute from the select subject matter fields and qualifiers, at which point decision 460 branches to the 'no' branch exiting the loop.

The process determines as to whether there are more combinations of subject matter fields that can be created (decision 470). If there are more combinations of subject matter fields that can be created, then decision 470 branches to the 'yes' branch which loops back to step 410 to select and process the next combination of subject matter fields to compute additional feature combinations. This looping continues until there are no more combinations of subject matter fields that can be created, at which point decision 470 branches to the 'no' branch exiting the loop. FIG. 4 processing thereafter ends at 495.

FIG. 5 is a depiction of a flowchart showing the logic used to automatically compute the features from the generated feature combinations that are used to enhance artificial intelligence machine learning. FIG. 5 processing commences at 500 and shows the steps taken by a process that computes features based upon the feature combinations that were computed in FIG. 4.

At step 510, the process selects the first feature combination from data store 330. At step 520, the process selects the first basis to apply to the selected feature combination. The basis can be a qualifier, such as a chronological qualifier, a geographical qualifier, or the like. In addition, some feature combinations may have no basis that is applied. The basis is retrieved from data store 525. For example, a chronological basis might be one or more of a number per day, week, weekday, weekend, month, year, etc. Likewise a geographical basis might be a geographic radius, within a particular city, state, country, or the like. The selected basis is stored in memory area 530.

At step 540, the process requests data pertaining to selected feature combinations and the selected basis (if a basis was selected) from AI system 100. In addition, models utilized by AI system 100 can be trained using the selected feature combination and the selected basis. At step 550, the process receives applicable data responsive to the data request. The responsive data is stored in data store 560.

At step 565, the process can perform one or more database queries against the resulting dataset that has been stored in data store 560. The results from these database queries are stored in data store 570.

The process determines as to whether there are more basis (e.g., chronological basis, geographical basis, etc.) that are to be used with the selected feature combination (decision 575). If there are more basis that are to be used with the selected feature combination, then decision 575 branches to the 'yes' branch which loops back to step 520 to select the next applicable basis from data store 525 and process the data as set forth above. This looping continues until there are no more basis that are to be used with the selected feature combination, at which point decision 575 branches to the 'no' branch exiting the loop.

The process determines as to whether there are more feature combinations to be processed from data store 330 (decision 580). If there are more feature combinations to be processed, then decision 580 branches to the 'yes' branch which loops back to select and process the next feature combination from data store 330. This looping continues until there are no more feature combinations to be processed, at which point decision 580 branches to the 'no' branch exiting the loop.

At step 585, the process analyzes the query results stored in data store 570 for any anomalies. In an insurance setting, such anomalies might be fraud detected in an insurance claim, etc. In one embodiment, these exceptions and anomalies are fed to AI system 100 to further train the model used by the AI system. FIG. 5 processing thereafter ends at 595.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   automatically computing a plurality of feature combinations based on a set of subject matter fields selected from a plurality of subject matter fields and one or more qualifiers that correspond to the selected set of subject matter fields;
   training a model in an artificial intelligence (AI) system using the computed plurality of feature combinations;
   requesting a dataset from the trained model of the AI system, wherein the request includes a selected one of the feature combinations and a basis to apply to the selected feature combination; and
   receiving, from the AI system, the requested dataset.

2. The method of claim 1 further comprising:
   selecting the feature combination; and automatically selecting the basis from a plurality of base is to apply to the selected feature combination.

3. The method of claim 2 further comprising:
performing one or more queries against the requested dataset, the queries resulting in a set of query results.

4. The method of claim 3 further comprising:
analyzing the set of query results, the analysis resulting in one or more anomalies.

5. The method of claim 4 further comprising:
training the model using the query results.

6. The method of claim 5 wherein the training of the model using the query results is based on the one or more anomalies.

7. The method of claim 4 wherein the model pertains to an insurance industry and wherein the anomalies pertain to insurance fraud.

8. An information handling system comprising:
one or more processors;
a memory coupled to at least one of the processors; and
a set of computer program instructions stored in the memory and executed by at least one of the processors in order to perform actions comprising:
automatically computing a plurality of feature combinations based on a set of subject matter fields selected from a plurality of subject matter fields and one or more qualifiers that correspond to the selected set of subject matter fields; and
training a model in an artificial intelligence (AI) system using the computed plurality of feature combinations;
requesting a dataset from the trained model of the AI system, wherein the request includes a selected one of the feature combinations and a basis to apply to the selected feature combination; and
receiving, from the AI system, the requested dataset.

9. The information handling system of claim 8 wherein the actions further comprise:
selecting the feature combination; and
automatically selecting the basis from a plurality of base is to apply to the selected feature combination.

10. The information handling system of claim 9 wherein the actions further comprise:
performing one or more queries against the requested dataset, the queries resulting in a set of query results.

11. The information handling system of claim 10 wherein the actions further comprise:
analyzing the set of query results, the analysis resulting in one or more anomalies.

12. The information handling system of claim 11 wherein the actions further comprise:
training the model using the query results.

13. The information handling system of claim 12 wherein the training of the model using the query results is based on the one or more anomalies.

14. The information handling system of claim 11 wherein the model pertains to an insurance industry and wherein the anomalies pertain to insurance fraud.

15. A computer program product stored in a computer readable storage medium, comprising computer program code that, when executed by an information handling system, performs actions comprising:
automatically computing a plurality of feature combinations based on a set of subject matter fields selected from a plurality of subject matter fields and one or more qualifiers that correspond to the selected set of subject matter fields; and
training a model in an artificial intelligence (AI) system using the computed plurality of feature combinations;
requesting a dataset from the trained model of the AI system, wherein the request includes a selected one of the feature combinations and a basis to apply to the selected feature combination; and
receiving, from the AI system, the requested dataset.

16. The computer program product of claim 15 wherein the actions further comprise:
selecting the feature combination; and
automatically selecting the basis from a plurality of base is to apply to the selected feature combination.

17. The computer program product of claim 16 wherein the actions further comprise:
performing one or more queries against the requested dataset, the queries resulting in a set of query results.

18. The computer program product of claim 17 wherein the actions further comprise:
analyzing the set of query results, the analysis resulting in one or more anomalies.

19. The computer program product of claim 18 wherein the actions further comprise:
training the model using the query results.

20. The computer program product of claim 19 wherein the training of the model using the query results is based on the one or more anomalies.

* * * * *